Figure 1:
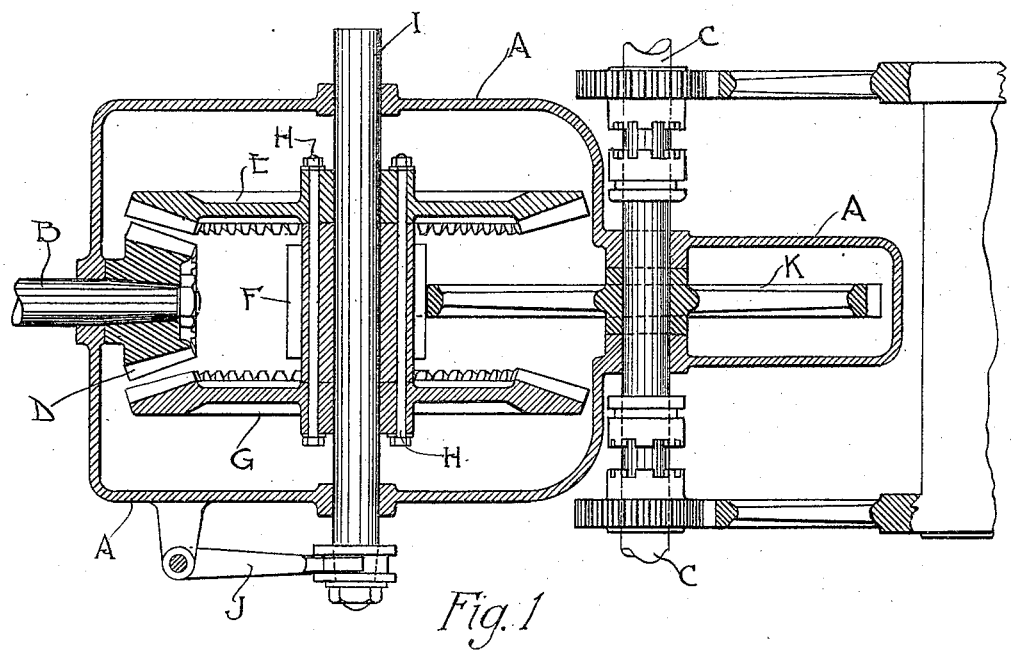

F. CORNELISON.
TRANSMISSION MECHANISM.
APPLICATION FILED DEC. 8, 1917. RENEWED JAN. 13, 1919.

1,296,629.

Patented Mar. 11, 1919.

INVENTOR
Floyd Cornelison
by
Gordon Grimes
his Attorney.

UNITED STATES PATENT OFFICE.

FLOYD CORNELISON, OF HAGUE, NORTH DAKOTA.

TRANSMISSION MECHANISM.

1,296,629. Specification of Letters Patent. Patented Mar. 11, 1919.

Original application filed December 4, 1916, Serial No. 135,079. Divided and this application filed December 8, 1917, Serial No. 206,319. Renewed January 13, 1919. Serial No. 270,947.

*To all whom it may concern:*

Be it known that I, FLOYD CORNELISON, a citizen of the United States of America, residing at the town of Hague, in the county of Emmons and State of North Dakota, have invented a new and useful Transmission Mechanism, of which the following is a specification.

My invention relates to a transmission which provides for a single and similar forward and reverse motion and has for its objects to provide such a transmission which shall be strong, simple and cheap to construct and which may be compactly mounted adjacent to the mechanism to be driven thereby.

This application relates to a portion of the matter shown in an application of this applicant filed December 4th, 1916, for windlass tractor and being Serial Number 135,079 of the United States Patent Office and is a division thereof.

I accomplish the objects named by the mechanism illustrated in the accompanying drawing which is a top view partly in section of my invention.

Transmission case A is mounted upon drive shaft B and driven shaft C. Pinion D is rigidly mounted upon shaft B. Gears E, F and G are firmly held together by bolts H and are rigidly mounted upon transmission shaft I. Lever J is adapted to hold shaft I in the position shown or in such position that either gear E or gear G is held in mesh with pinion D thereby imparting to gear F either a forward or reverse motion. Gear F is continuously in mesh with gear K which is mounted upon shaft C and contained within transmission case A.

By my invention a perfect alinement of the drive shaft, transmission and driven shaft is obtained and in view of the small number of parts and the fact that no small parts are required the same can be built both cheaply and with great strength.

I claim:

1. In a mechanism of the kind described a drive shaft and pinion, a transmission shaft having mounted thereon two bevel gears and a driving gear, means for engaging either of the bevel gears with the pinion and thereby imparting a forward or reverse motion to the drive gear, a driven gear mounted upon a driven shaft and adapted to be held continuously in mesh with the driving gear.

2. In a mechanism of the kind described a drive shaft and pinion, a transmission shaft having mounted thereon two bevel gears and a driving gear, means for engaging either of the bevel gears with the pinion and thereby imparting a forward or reverse motion to the drive gear, a driven gear mounted upon a driven shaft and adapted to be held continuously in mesh with the driving gear and a transmission case and means for mounting the same upon the drive shaft and upon the driven shaft.

FLOYD CORNELISON.

Copies of this patent may be obtained for five cents each, by addressing the "Commissioner of Patents, Washington, D. C."